US009189566B2

(12) United States Patent
Roy et al.

(10) Patent No.: US 9,189,566 B2
(45) Date of Patent: Nov. 17, 2015

(54) FACILITATING EXTRACTION AND DISCOVERY OF ENTERPRISE SERVICES

(75) Inventors: Marcus Roy, Kimbilli (AU); Basem Suleiman, North Sydney (AU); Michael Stollberg, Dresden (DE)

(73) Assignee: SAP SE, Walldorf (DE)

(*) Notice: Subject to any disclaimer, the term of this patent is extended or adjusted under 35 U.S.C. 154(b) by 41 days.

(21) Appl. No.: 12/961,689

(22) Filed: Dec. 7, 2010

(65) Prior Publication Data
US 2012/0143867 A1 Jun. 7, 2012

(51) Int. Cl.
G06F 17/30 (2006.01)
(52) U.S. Cl.
CPC ............................... *G06F 17/30943* (2013.01)
(58) Field of Classification Search
CPC .......... G06F 17/3071; G06F 17/30864; G06F 17/30598; G06F 17/30705; G06F 17/30265; G06F 17/30943
USPC ........................................................ 707/737
See application file for complete search history.

(56) References Cited

U.S. PATENT DOCUMENTS

| 5,600,775 | A  | * | 2/1997  | King et al. ..................... 715/203 |
| 7,124,093 | B1 |   | 10/2006 | Graham et al. |
| 7,225,199 | B1 |   | 5/2007  | Green |
| 7,496,912 | B2 | * | 2/2009  | Keller et al. ................... 717/174 |
| 7,526,425 | B2 |   | 4/2009  | Marchisio et al. |
| 7,757,276 | B1 |   | 7/2010  | Lear |
| 7,844,612 | B2 | * | 11/2010 | Colgrave et al. .............. 707/754 |
| 8,478,722 | B2 | * | 7/2013  | Lee et al. ...................... 707/622 |
| 8,548,938 | B2 | * | 10/2013 | Amaru et al. .................. 707/603 |
| 2005/0021490 | A1 |   | 1/2005  | Chen et al. |
| 2006/0074980 | A1 |   | 4/2006  | Sarkar |
| 2006/0117073 | A1 | * | 6/2006  | Bosworth et al. ............. 707/201 |
| 2006/0271563 | A1 |   | 11/2006 | Angelo et al. |
| 2006/0277166 | A1 | * | 12/2006 | Vogler-Ivashchanka et al. 707/3 |

(Continued)

FOREIGN PATENT DOCUMENTS

EP 542430 A2 5/1993

OTHER PUBLICATIONS

J. Beaton et al., "Usability challenges for Enterprise Service-oriented Architecture APIs," 2008 IEEE Symposium on Visual Languages and Human-Centric Computing, VL/HCC'09, Sep. 2008, Corvallis, Oregon, USA, pp. 193-196.

(Continued)

*Primary Examiner* — James Trujillo
*Assistant Examiner* — Jessica N Le
(74) *Attorney, Agent, or Firm* — Fish & Richardson P.C.

(57) ABSTRACT

Implementations of the present disclosure include methods for annotating an enterprise service that is electronically stored in an enterprise service repository. In some implementations, methods include generating one or more graphs based on one or more artifacts, the one or more artifacts resulting from a development process of the enterprise service, generating one or more metadata repositories based on the one or more artifacts, each metadata repository comprising instance data corresponding to one of the one or more graphs, storing the one or more graphs and the one or more metadata repositories to a knowledge base provided in a computer-readable medium, determining one or more annotations based on the one or more graphs and the one or more metadata repositories, associating the one or more annotations to the enterprise service, and storing the one or more annotations in the enterprise service repository.

13 Claims, 9 Drawing Sheets

(56) References Cited

U.S. PATENT DOCUMENTS

| | | | |
|---|---|---|---|
| 2007/0033221 A1* | 2/2007 | Copperman et al. | 707/103 R |
| 2007/0073736 A1* | 3/2007 | Goetz | 707/100 |
| 2007/0162482 A1* | 7/2007 | Flaxer et al. | 707/101 |
| 2008/0201355 A1* | 8/2008 | Bloesch et al. | 707/102 |
| 2008/0301625 A1* | 12/2008 | Cook et al. | 717/104 |
| 2009/0012778 A1 | 1/2009 | Feng et al. | |
| 2009/0024561 A1* | 1/2009 | Palanisamy | 707/1 |
| 2009/0083058 A1* | 3/2009 | Beringer et al. | 705/1 |
| 2009/0106744 A1* | 4/2009 | Li et al. | 717/151 |
| 2009/0164497 A1* | 6/2009 | Steinmaier et al. | 707/102 |
| 2009/0244877 A1* | 10/2009 | Yeh et al. | 361/818 |
| 2009/0256586 A1* | 10/2009 | Oguri | 326/30 |
| 2010/0010974 A1* | 1/2010 | Chieu et al. | 707/4 |
| 2010/0023445 A1* | 1/2010 | Feaver et al. | 705/37 |
| 2010/0070448 A1 | 3/2010 | Omoigui | |
| 2010/0114629 A1* | 5/2010 | Adler et al. | 705/7 |
| 2010/0169134 A1* | 7/2010 | Cheng et al. | 705/7 |
| 2010/0211924 A1* | 8/2010 | Begel et al. | 717/101 |
| 2011/0029479 A1* | 2/2011 | Novak et al. | 707/610 |
| 2011/0035650 A1* | 2/2011 | Jardine-Skinner et al. | 715/205 |
| 2011/0040766 A1 | 2/2011 | Robinson et al. | |
| 2011/0106801 A1* | 5/2011 | Srivastava et al. | 707/737 |
| 2011/0131247 A1* | 6/2011 | Brown et al. | 707/792 |
| 2011/0231365 A1* | 9/2011 | Bahl et al. | 707/626 |
| 2011/0320479 A1* | 12/2011 | Burris et al. | 707/769 |
| 2012/0124547 A1* | 5/2012 | Halbedel | 717/100 |
| 2012/0304174 A1* | 11/2012 | Arnold et al. | 718/1 |

OTHER PUBLICATIONS

J. Beaton et al., "Usability evaluation for Enterprise SOA APIs," 2nd International Workshop on Systems Development in SOA Environments, (SDSOA 2008), Co-located with ICSE 2008, Leipzig, Germany, May 12, 2008. pp. 29-34.

SAP, "Governance for Modeling and Implementing Enterprise Services at SAP," SAP SDN Community, Apr. 2007, Walldorf, Germany, retrieved from www.sdn.sap.com/irj/scn/go/portal/prtroot/docs/library/uuid/f0763dbc-abd3-2910-4686-ab7adfc8ed92?QuickLink=index&overridelayout=true, 28 pages.

SAP, "PI Best Practices: Modeling," SAP SDN Community, May 2009, retrieved from www.sdn.sap.com/irj/scn/go/portal/prtroot/docs/library/uuid/303856cd-c81a-2c10-66bf-a4af539b8a3e?QuickLink=index\&overridelayout=true, 30 pages.

X. Dong et al., "Similarity Search for Web Services," Proceedings of the 30th International Conference on Very Large Data Bases (VLDB), Aug. 29-Sep. 3, 2004, Toronto, Canada, pp. 372-383.

M. Stollberg et al., "Two-Phase Web Service Discovery Based on Rich Functional Descriptions," 4th European Semantic Web Conference (ESWC), Jun. 2007, Innsbruck, Austria, pp. 99-113.

N. Steinmetz et al., "Web Service Search on Large Scale," International Conference on Service Oriented Computing (ICSOC) 2009, Nov. 2009, Stock-holm, Sweden, pp. 437-444.

E. Toch et al., "OPOSSUM: Bridging the gap between Web Services and the Semantic Web," The 6th Conference on Next Generation Information Technologies and Systems (NGITS'2006), Jul. 4-6, 2006, pp. 357-358.

P. Kungas et al., "Cost-Effective Semantic Annotation of XML Schemas and Web Service Interfaces," 2009 IEEE International Conference on Services Computing, Sep. 2009, pp. 372-379.

K. Quinn, "Not Everyone Who Drives a Car Fixes It Themselves," Information Management Nov. 10, 2005, retrieved from www.information-management.com/news/1041222-1.html, 11 pages.

F.A. Grootjen et al., "Conceptual query expansion," Data & Knowledge Engineering, vol. 56, No. 2, Feb. 2006, pp. 174-193.

E. Hyvönen et al., "Ontogator: Combining View- and Ontology-Based Search with Semantic Browsing," Proceedings of XML Finland 2003, Open Standards, XML, and the Public Sector, Kuopio, Oct. 30-31, 2003, 16 pages.

W. Fang et al., "Toward a Semantic Search Engine Based on Ontologies," Proceedings of the Fourth International Conference on Machine Learning and Cybernetics, Guangzhou, Aug. 2005, pp. 1913-1918.

A. Burton-Jones et al., "A Heuristic-Based Methodology for Semantic Augmentation of User Queries on the Web," 22nd International Conference on Conceptual Modeling (ER 2003), Oct. 2003, pp. 476-489.

E. Kapetanios et al., "Simplifying Syntactic and Semantic Parsing of NL-based Queries in Advanced Application Domains," Data & Knowledge Engineering, vol. 55, Nr. 1, Oct. 2005, pp. 38-58.

Jordi Conesa et al., "Improving web-query processing through semantic knowledge," *Data & Knowledge Engineering*, vol. 66, No. 1, Jul. 2008, pp. 18-34.

Marcus Roy et al., "Facilitating Enterprise Service Discovery for Non-technical Business Users," Proceedings of the 8th International Conference on Service Oriented Computing, ICSOC'10, Dec. 2010, pp. 100-110.

H.H. Hoang et al., "The State of the Art of Ontology-based Query Systems: A Comparison of Existing Approaches," Proceedings of the IEEE International Conference on Computing & Informatics (ICOCI 2006), Jun. 2006, 6 pages.

Jens Hartmann et al., "Ontology-Based Query Refinement for Semantic Portals," *From Integrated Publication and Information Systems to Information and Knowledge Environments*, LNCS 3379, 2005, pp. 41-50.

B. Aleman-Meza et al., "Ranking Documents Semantically Using Ontological Relationships," 2010 IEEE Fourth International Conference on Semantic Computing, Sep. 2010, pp. 299-304.

Falk Brauer, "Graph-based Concept Identification and Disambiguation for Enterprise Search," Proceedings of the 19th International Conference on World Wide web, WWW'10, May 1-5, 2001, pp. 171-180.

Marcus Roy et al., "Using SOA Governance Design Methodologies to Augment Enterprise Service Descriptions," Proceedings of the 23rd International Conference on Advanced Information Systems, CAiSE'11, Jun. 20-24, 2011, pp. 566-581.

Bruce W. Watson, "A New Algorithm for the Construction of Minimal Acyclic DFAs," *Science of Computer Programming*, vol. 48, Issue 2-3, Aug.-Sep. 2003, pp. 81-97.

Marcus Roy et al., "Extending Enterprise Service Design Knowledge using Clustering," Proceedings of the International Conference on Service Orientated Computing, ICSOC 2012, Nov. 12-15, 2012, 15 pages.

Yonggang Qiu et al., "Concept Based Query Expansion," Sigir Forum, ACM, New York, NY, US, Spec. Issue, Jun. 27, 1993, 10 pages.

Jason J. Jung, "Service chain-based business alliance formation in service-oriented architecture," Expert Systems with Applications, vol. 38, No. 3, Mar. 1, 2011, pp. 2206-2211.

European Search Report for European Patent Application No. 12007449.7, dated Apr. 17, 2013, 8 pages.

\* cited by examiner

FACILITATING EXTRACTION AND DISCOVERY OF ENTERPRISE SERVICES

BACKGROUND

Enterprise services provide programmatic access to an immense, and already existing, pool of business data and functionality provided by large enterprise applications. Example enterprise applications include Enterprise Resource Planning (ERP) and Customer Relationship Management (CRM) applications provided by SAP AG of Walldorf, Germany. The reuse of enterprise services enables rapid, agile and cost-effective development of composite applications. Enterprise services can represent highly-integrated web services that access defined business data and logic of existing business processes. As such, they differ significantly in quantity and complexity from regular Web Services (e.g. advertising application program interfaces (APIs)) due to applied governance and sustainability constraints.

Searching a repository of enterprise services can be difficult due to the syntactical nature of service definitions and missing meaning that is required to successfully find enterprise services. Enterprise services are more intricate as a result of the complexity of business process and application functionality that they represent. Consequently, traditional enterprise service discovery targets developers that have the required technical skills to understand service definitions. In contrast, business users have detailed knowledge of business processes, but no or little technical background. Given that enterprise services are defined at a business level based on existing business requirements, business users naturally qualify as users that would search for enterprise services.

SUMMARY

Implementations of the present disclosure include computer-implemented methods for annotating an enterprise service that is electronically stored in an enterprise service repository. In some implementations, methods include generating one or more graphs based on one or more artifacts, the one or more artifacts resulting from a development process of the enterprise service, generating one or more metadata repositories based on the one or more artifacts, each metadata repository including instance data corresponding to one of the one or more graphs, storing the one or more graphs and the one or more metadata repositories to a knowledge base provided in a computer-readable medium, determining one or more annotations based on the one or more graphs and the one or more metadata repositories, associating the one or more annotations to the enterprise service, and storing the one or more annotations in the enterprise service repository.

In some implementations, determining one or more annotations includes: receiving a name of the enterprise service, parsing the name of the enterprise service to provide one or more terms, querying the knowledge base using the one or more terms, and receiving a non-empty result based on the querying. In some implementations, the non-empty result includes the one or more annotations.

In some implementations, the one or more annotations each correspond to a node of metadata of the one or more metadata repositories.

In some implementations, methods further include generating an enterprise service signature as a concatenation of terms of one or more nodes of the one or more graphs, associating the enterprise service signature to the enterprise service, and storing the enterprise service signature in the enterprise service repository.

In some implementations, methods further include: receiving a search query comprising one or more search terms, querying the enterprise service repository using the one or more search terms, identifying, in response to the querying, one or more enterprise services as relevant to the one or more search terms, and transmitting a representation of each of the one or more enterprise services for display as a result of the search query.

In some implementations, each of the one or more metadata repositories is provided in a resource description framework (RDF) data store. In some implementations, the RDF store includes one or more RDF triples that correspond to one or more edges between nodes of metadata.

In some implementations, the one or more artifacts each comprise one of a business requirements artifact, a component model taxonomies artifact and a governance conventions artifact.

In some implementations, the enterprise name is provided in Pascal Case notation.

In some implementations, the development process corresponds to a governance process of an enterprise associated with the enterprise service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to improving the quality of search results for searching a repository of enterprise services. In particular, implementations of the present disclosure support a business user's perspective to overcome deficiencies of currently existing enterprise service search techniques. Implementations of the present disclosure improve retrieval accuracy and do not solely focus on technical aspects. In accordance with implementations of the present disclosure, this is achieved through the reuse artifacts that have been used to create an enterprise service in accordance with a governance process, and to automatically enrich enterprise service descriptions.

An enterprise service is a callable entity that provides business functionality and is published in an enterprise services repository (ESR). Enterprise services are structured according to a harmonized enterprise model based on global data types (GDTs), process components, and business objects. In some implementations, enterprise services are well documented, safeguard quality and stability and are based on open standards. An enterprise service can be developed in accordance with a governance process, the development providing one or more artifacts, discussed in further detail below. An example governance process includes mandatory modeling and implementation guidelines for each new enterprise service development, a special review process having a plurality of quality gates, and regularly executed manual and automated tests for each service operation to safeguard functional correctness.

Figure 1:
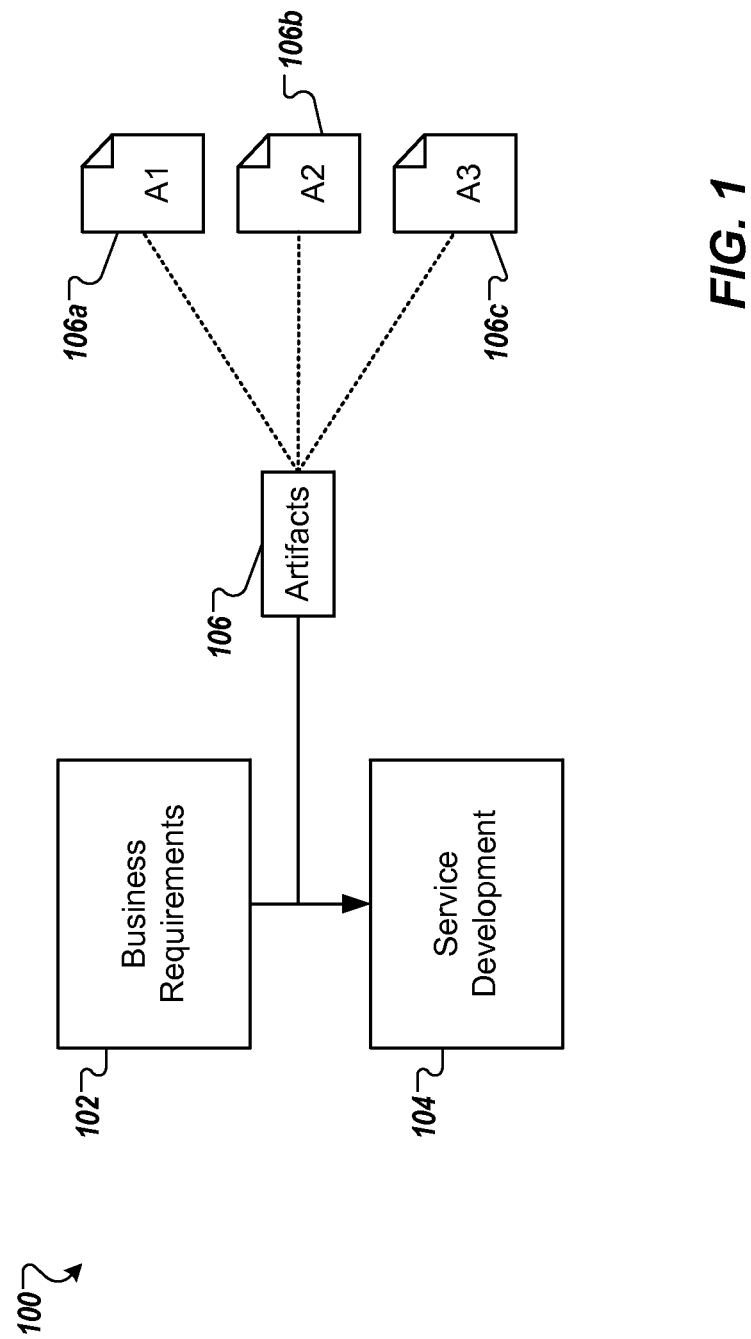
FIG. 1 depicts a high-level block diagram of a service development process according to a top-down approach reusing artifacts of an example governance process.

Referring now to FIG. 1, enterprise service development can follow a top-down approach beginning with the identification of business requirements down to the definition of the service structure. This stands in contrast to a bottom-up approach, which exposes application program interfaces (APIs) of existing enterprise services as web services. As a consequence, enterprise services can be based on description models, guidelines and in-house conventions to ensure governance compliance. Enterprise service developers are given documents that define this information. These documents are referred to as artifacts. In some implementations, artifacts can be explicitly manifested as documents and/or can be implicitly manifested in the form of existing knowledge residing within developers. These artifacts are recurrently applied during the enterprise service development process.

FIG. 1 depicts a high-level block diagram of a service development process 100 according to a top-down approach. The service development process 100 includes a business requirements phase 102 and a service development phase 104. The service development process 100 generates a plurality of artifacts $(A_1, \ldots, A_3)$ 106a-c, collectively referred to using reference number 106. The example artifacts of FIG. 1 include a business requirements artifact $(A_1)$ 106a, a component model taxonomics artifact $(A_2)$ 106b, and a governance conventions best practices document $(A_3)$ 106c.

By way of non-limiting example, enterprise services can be developed according to key concepts of an enterprise model and a standard governance process. The enterprise model includes a hierarchical component model that provides non-redundant and well-defined business content that is made accessible via enterprise services. The governance process defines common naming conventions and guidelines as to how to develop enterprise services that not only ensure harmonization and consistency of enterprise services across various platforms, but also create a mutual understanding between stakeholders and customers. The component model and governance process that are used during the service development process can be understood as artifacts and defined in a knowledge base, as discussed in further detail herein.

Figure 2:
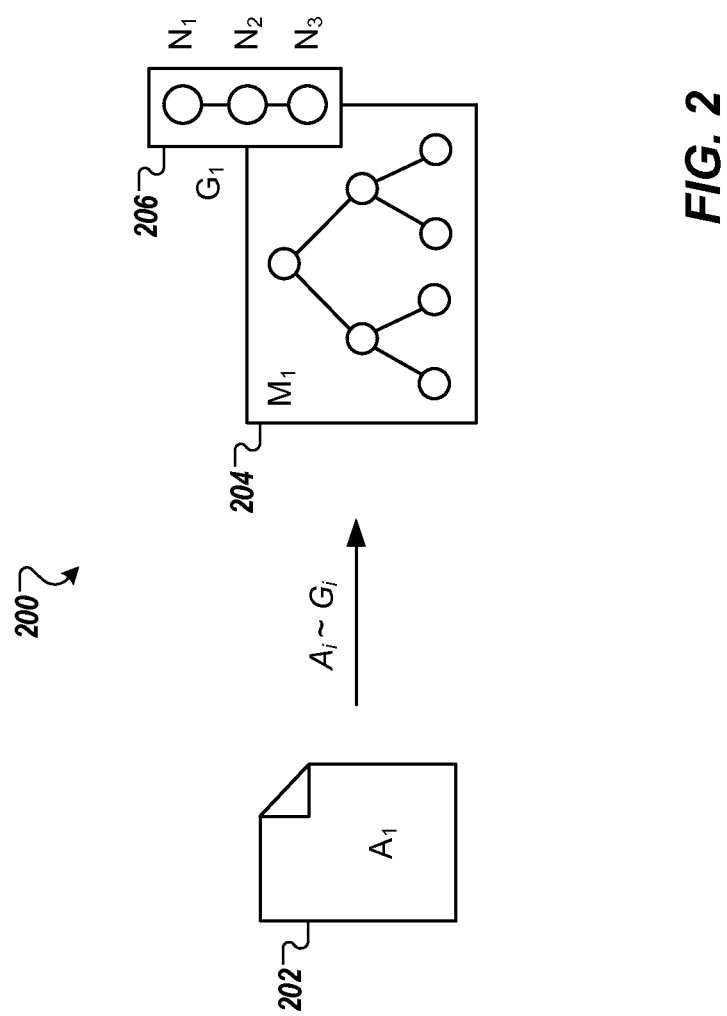
FIG. 2 depicts an example hierarchical structure representing an example governance artifact.

Referring now to FIG. 2, an artifact representation 200 will be described. The artifact representation 200 is provided as a data model of taxonomic schemes and provides a formal definition of artifacts, discussed above. The number of taxonomic schemes varies based on the number of artifacts that have been identified and used during the service development of the particular enterprise service. Artifacts can be described in the form of a hierarchical structure, which provides a tree representation of the respective meta-information. In some implementations, the artifact representation is based on an artifact $(A_n)$ 202 and includes instance, or metadata $(M_n)$ 204 and a graph $(G_n)$ 206, which are discussed in further detail below.

With regard to artifacts, n artifacts $(A=\{A_1, A_2, \ldots, A_n\})$ can be represented as graphs $(G=\{G_1, G_2, \ldots, G.\})$, where $A_i \sim G_i$ denotes that artifact $A_i$ can be transformed into graph $G$. The graph $G_i$ can be defined as $G_i = (N, \epsilon)$, where $N=\{N_1, N_2, \ldots, N_m\}$ defines m nodes in the graph $G_i$ and $\epsilon$ represents the sequence of direct edges $E=(N_i, \psi, N_j)$ from node $N_i$ to node $N_j$ with the relationship $\psi$. A metadata repository can be defined as collection of the metadata 204. In particular, a metadata repository can be defined as $M=\{M_1, M_2, \ldots, M_n\}$, with $G_i \rightarrow M_i$ denoting that, for each $G_i$, there is a metadata repository with the respective instance data references as $M_i$. As discussed in further detail below, a repository for electronically storing annotated enterprise services is denoted as D. Instance data is data that is automatically extracted from various sources. Example sources can include corporate Web pages or other documents (e.g., spreadsheets, presentations, etc.). The instance data provided above relates to conceptual nodes. The relation can include classes and instances of classes. In the illustrated examples provided herein, a Business Object (class) can be a Sales Order, Purchase Order, Customer (instance), for example.

Implementations of the present disclosure further provide an enterprise service signature $(S_B)$ that is associated with each enterprise service. Each enterprise service signature $(S_B)$ can be provided as a concatenation of terms $N_j$ representing the jth level of graph G. Each enterprise service signature $(S_B)$ can be defined according to a building rule (B) as follows:

$$S_B = (._B, G_i N_j) \text{ with } B = (i,j)^+ | \forall i,j : (i,j) \rightarrow G_i N_j$$

Enterprise service signatures represent technical names that are used to unambiguously identify enterprise services. For example, the enterprise service signature can be used as the search criteria, if know to a searching user, to make service retrieval more precise.

Implementations of the present disclosure further provide a datastore for the resulting knowledge base. In some implementations, the knowledge base is provided as a resource description framework (RDF) data store. Each graph $G_i$ can be provided as a unique RDF store $M_i$ that contains RDF triples $(T=\{T_1, T_2, \ldots, T_n\})$, which directly relates to $\epsilon$ where $N_i$ is the subject, $\psi$ is the predicate and $N_j$ the object.

Figure 3:
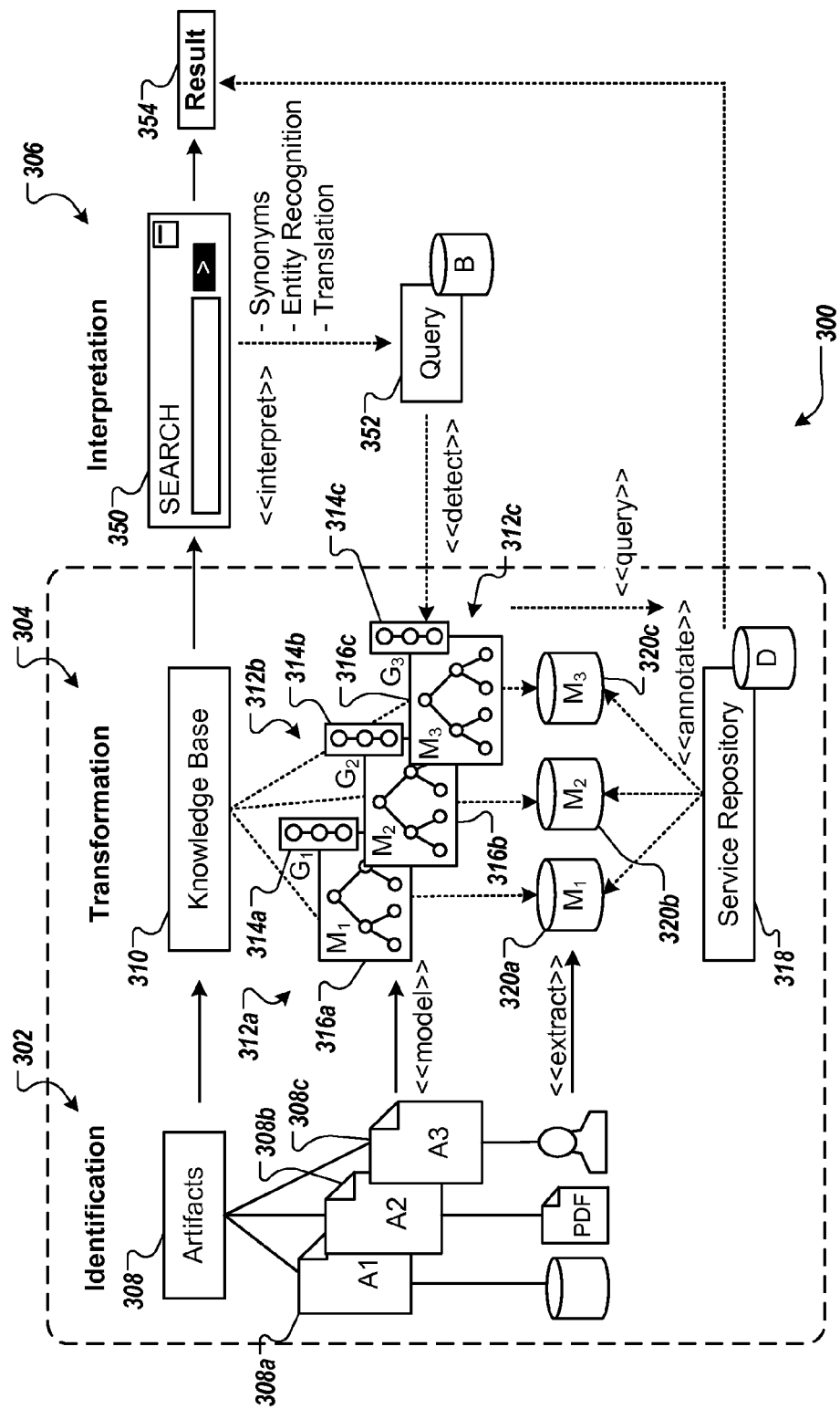
FIG. 3 depicts an example architecture of an enterprise discovery framework in accordance with implementations of the present disclosure.

Referring now to FIG. 3, an example architecture of an enterprise discovery framework 300 will be described. The example enterprise framework includes an identification phase 302, a transformation phase 304 and an interpretation phase 306, and incorporates the identification and definition of artifacts 308a, 308b, 308c, collectively, artifacts 308 combined in a knowledge base 310. In particular, the knowledge base 310 is constructed based on artifact representations 312a, 312b, 312c of the artifacts 308a, 308b, 308c, respectively. The artifact representations 312a, 312b, 312c include respective graphs 314a, 314b, 314c and respective metadata 316a, 316b, 316c. A service repository 318 stores the enterprise services. The artifacts 308a, 308b, 308c of a particular enterprise service stored within the service repository 318 are modeled to provide the artifact representations 312a, 312b, 312c. The artifacts 308 are the artifacts that were a result of the original development of the particular enterprise service, which development was corresponded to a given governance process. The metadata is extracted to provide respective RDF stores 320a, 320b, 320c, and the particular enterprise service is annotated based on the metadata.

With continued reference to FIG. 3, a user can access a graphical user interface (GUI) to search the enterprise repository for one or more enterprise services that may be relevant to the particular user's needs. In some implementations, the GUI can be provided as a web-based portal that is executed on a client computing device that can communicate with the enterprise discovery framework 300 over a network, for example. In such implementations, the enterprise discovery framework 300 can be provided at one or more back-end servers. The GUI can include a search dialogue box 350, in which the user can input search terms. Upon inputting the search terms, the search terms can be processed in accordance with known search techniques to provide a query. By way of non-limiting example, the original search terms can be processed and/or interpreted to provide synonyms, entity recognition (e.g., an entity associated with the particular user) and/or translation of search terms in accordance with the building rule (B) to provide the query 352. The query 352 can be applied to the enterprise discovery framework to generate a result 354. The result 354 can include one or more enterprise services that are stored in the service repository 318 and that have annotations corresponding to the search terms input by the user.

Figure 4A:
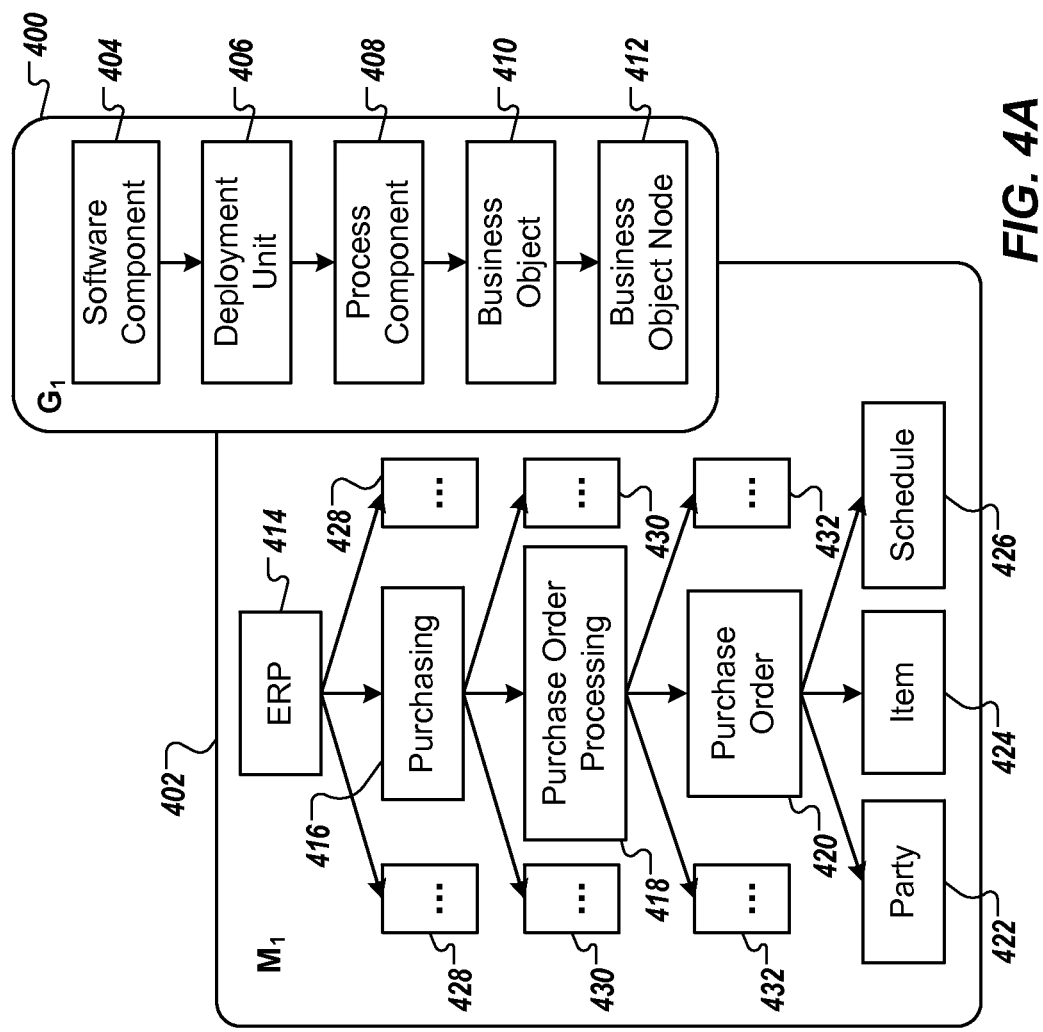
FIGS. 4A and 4B depict example component model schemas and corresponding metadata for example artifacts.
Figure 4B:
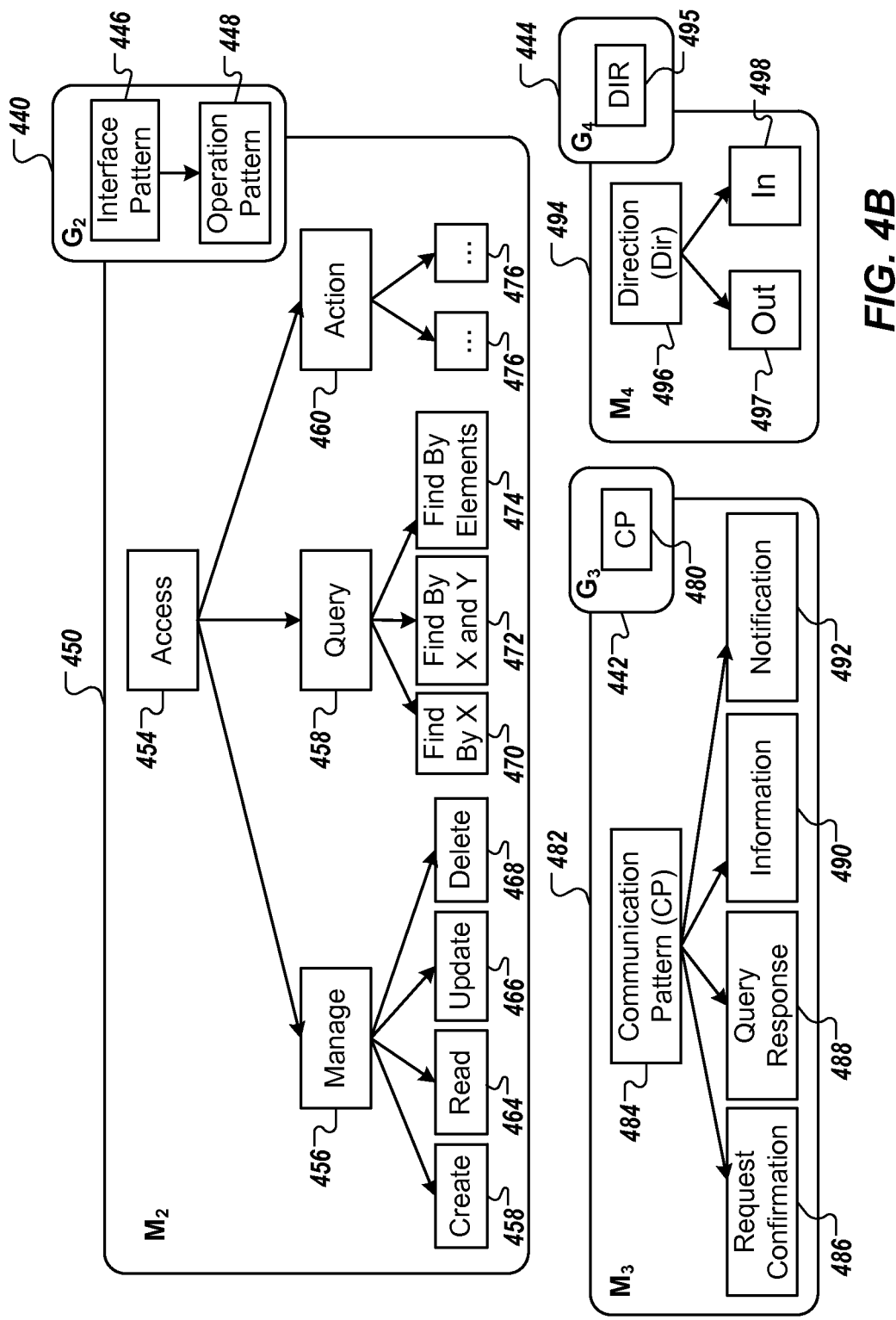
Figure 5:
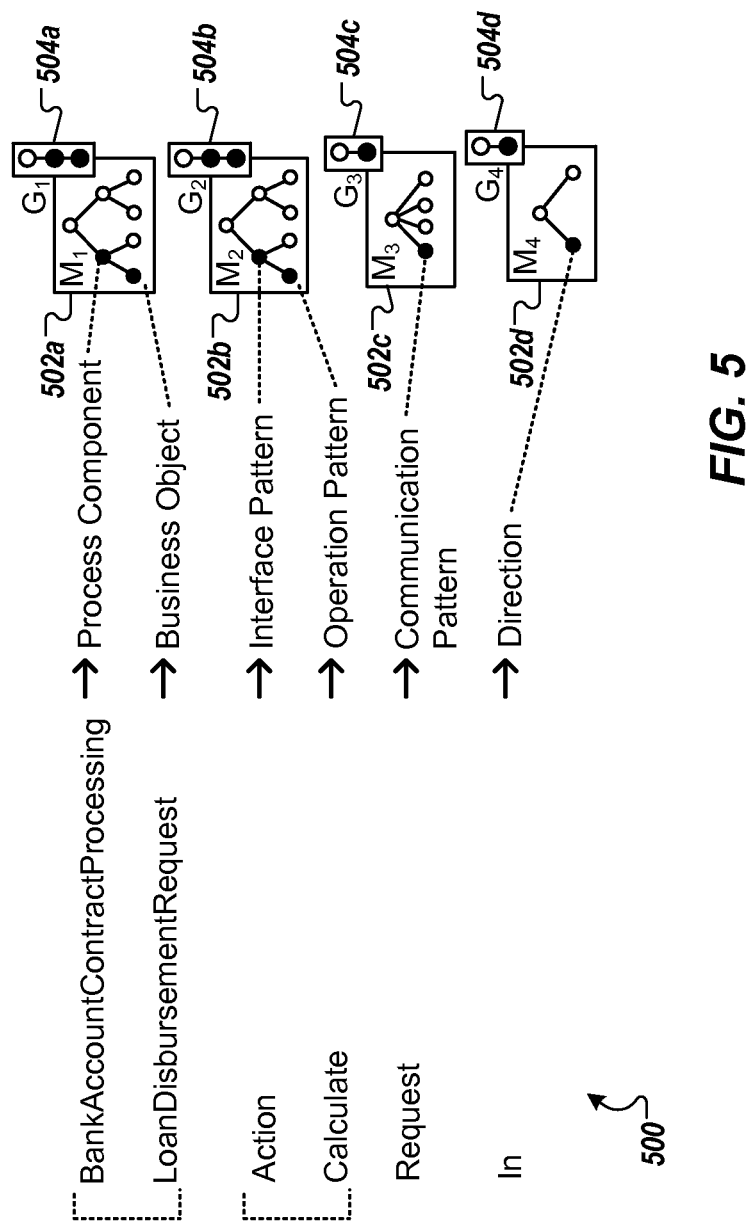
FIG. 5 is a diagram of an example intrinsic service signature.

Referring now to FIGS. 4A, 4B and 5, a non-limiting example use case will be described to illustrate implementations of the present disclosure. As discussed above, the development of enterprise services can adhere to a standard governance process that results in one or more artifacts. In the example use case, a component model artifact and a process integration content (PIC) methodology artifact that are used to develop example enterprise services are considered. The component model artifact describes the physical relationship of enterprises services to the enterprise model. The PIC methodology artifact influences the logical definition of enterprise services. Each enterprise service is defined based on a component model that can be referred to as an enterprise model. Each enterprise service is assigned to a business object, which represents a well-defined business entity or document. The business object itself belongs to a process component that logically groups connected business objects and is part of a value chain. Decoupled process components belong to a deployment unit that belongs to a specific software version.

In FIG. 4A, an example artifact is represented in the form of an example taxonomic scheme including a graph ($G_1$) 400 and corresponding example metadata ($M_1$) 402. The taxonomic scheme 400 includes a software component (SC) node 404, a deployment unit (DU) node 406, a process component (PC) node 408, a business object (BO) node 410 and a business object node (BON) node 412. The business object node (BON) describes parts of the business object that it belongs to. As such, the BON can be seen as a property or attribute of the business object. For example, the business object "Sales Order" includes one or more BONs, such as "Item," which is an item that has been purchased as part of the particular sales order. A deployment unit groups process components that interact with each other and that are to be installed together on a system. Deployment units show the type of interactions between process components within the deployment unit. A process component enables governance and understanding the business semantics of enterprise services in a business process platform.

With continued reference to FIG. 4A, the metadata 402 corresponds to the graph 400. The example metadata 402 includes ERP metadata 414, purchasing metadata 416, purchase order processing metadata 418, purchase order metadata 420, party metadata 422, item metadata 424 and schedule metadata 426. The example metadata is provided as a hierarchical tree, in which the ERP metadata 414 is provided as the root node, and the metadata 416-426 as leaf nodes. In particular, the ERP metadata 414 is provided as the parent node to the purchasing metadata 416 and other, unspecified metadata 428. The purchasing metadata 416 is provided as the parent node to the purchase order processing metadata 418 and other, unspecified metadata 430. The purchase order processing metadata 418 is provided as the parent node to the purchase order metadata 420 and other, unspecified metadata 432. The purchase order metadata 420 is provided as the parent node to the party metadata 422, the item metadata 424 and the schedule metadata 426.

Referring now to FIG. 4B, a PIC methodology artifact will be discussed in detail. As noted above, the PIC methodology artifact influences the logical definition of enterprise services. Consequently, and as discussed in further detail below, the structure and signature of enterprise services is based on a standardized and hierarchical arranged access pattern graph ($G_2$) 440, communication pattern (CP) graph ($G_3$) 442 and direction (DIR) pattern graph ($G_3$) 444. The access pattern graph 440 includes an interface pattern (IP) node 446 and an operation pattern (OP) node 448. The access pattern manages access to the component model. Interface patterns are defined to ensure the behavioral integrity of the enterprise services. In particular, when modeling service operations and service interfaces, predefined patterns can be used to ensure that the naming and definition of the enterprise services are unified. Interface patterns define naming rules for operations and service interfaces based on the business object and its node structure, grouping rules for the operations in the service interfaces, naming rules for the message types, and rules for the message choreography of an enterprise service interaction.

Metadata ($M_2$) 450 showcases the instance of the interface pattern that groups instances of operations based on a CRUD-like pattern (i.e., create, read, update and cancel). The metadata ($M_2$) 450 includes an access node 454 that is a parent node of a manage node 456, a query node 458 and an action node 460. The manage node 456 is a parent node of a create node 462, a read node 464, an update node 466 and a delete node 468. The query node 458 is a parent node of a Find By X node 470, a Find By X And Y node 472 and a Find By Elements node 474. The action node 460 is the parent node of other, unspecified nodes 476.

The manage node 456 corresponds to a manage interface pattern that can be used for modeling application accesses.

The manage interface pattern describes the synchronous access to the business object from a UI component or from other clients, and defines rules for naming enterprise service operations and service interfaces, rules for grouping enterprise service operations into service interfaces, rules for naming message interfaces, and rules for the message choreography of an enterprise service interaction. The query node 458 corresponds to a query interface pattern that describes the search for data records by means of selection criteria that are handed over to the operation. The action node 460 corresponds to an action object that represents a function within an application component that is not further subdivided. Actions divide up the process flow of an integration scenario, and actions in different application components can exchange messages with each other within an integration scenario.

The communication pattern ($G_3$) 452 includes a communication pattern node 480, and illustrates a basic schema of the communication pattern with respective instances in metadata ($M_3$) 482. The metadata ($M_3$) 482 includes a communication pattern (CP) node 484 that is a parent node of a request confirmation node 486, a query response node 488, an information node 490 and a notification node 492. The metadata ($M_3$) 482 describes the nature of interaction with the component model. For example, "RequestConfirmation" represents an action executed at the backend system that requires a confirmation, whereas "QueryResponse" typifies a plain information retrieval with no implications.

In some implementations, communication patterns describe an atomic dialog between a sender and a receiver, and example communication patters include a request/confirmation pattern, a query/response pattern, an information pattern and a notification pattern. The request/confirmation pattern provides that messages are sent back and forth (i.e., inbound (IN) and outbound (OUT) directions) and that the state maintained by the service may change. The query/response pattern provides that messages are sent back and forth (i.e., IN and OUT directions), but the state maintained by the service does not change. The notification provides that a service sends a message that contains a notification of an event (i.e., IN direction). The information pattern provides that a service sends a message containing other information (i.e., IN direction). The direction pattern graph ($G_4$) 444 and corresponding metadata ($M_4$) 494 respectively define the direction pattern of an enterprise service to be either inbound or outbound. The direction pattern ($G_4$) 444 includes a DIR node 495. The metadata ($M_4$) 494 includes a direction (Dir) node 496 that is a parent node of an OUT node 497 and an IN node 498.

The formalism for the example use case is as follows:
Schema $G_1$: Component Model (FIG. 4A)

| | |
|---|---|
| $G_1 = (N_{CM}, \epsilon_{CM})$ | |
| $N_{CM} = \{N_1:SC, N_2:DU, N_3:PC, N_4:BO, N_5:BON\}$ | SC: software component |
| $\epsilon_{CM} = \{(N_1:SC, hasDU, N_2:DU),$ | DU: deployment unit |
| $(N_2:DU, hasPC, N_3:PC),$ | PC: process component |
| $(N_3:PC, hasPO, N_4:BO),$ | BO: business object |
| $(N_4:BO, hasBON, N_5:BON)\}$ | BON: business object node |

Schema $G_2$: PIC Methodology—Access Pattern (FIG. 4B)

| | |
|---|---|
| $G_2 = (N_{PIC}, \epsilon_{PIC})$ | |
| $N_{PIC} = \{N_1:AC, N_2:IP, N_3:OP\}$ | AC: access |
| $\epsilon_{PIC} = \{(N_1:AC, hasIP, N_2:IP),$ | IP: interface pattern |
| $(N_2:IP, hasOP, N_3:OP)\}$ | |

Instances $M_1$: Component Model (FIG. 4A)

$M_1 = \{ \ldots, (\text{PurchaseOrderProcessing,has BO ,PurchaseOrder}), (\text{PurschaseOrder,has BON, Item}), \ldots \}$ Instances $M_2$: PIC Methodology—Access Pattern (FIG. 4B)

$M_2 = \{ \ldots, (\text{Manage,hasOP,Create}), (\text{Manage,hasOP, Read}), \ldots \}$ Building rule and enterprise service signature:

$$B_1 = (i, j)^2 = (2, 3) + (1, 4)$$

$$\begin{aligned} S_{B1} &= (.B_1, G_iN_j) \\ &= G_2N_3 \cdot G_1N_4 \\ &= \{Creat, \text{Read}, \ldots\} \cdot \{SalesOrder, PurchaseOrder, \ldots\} \\ &\quad G_2 \rightarrow M_2 \qquad\qquad G_1 \rightarrow M_1 \end{aligned}$$

In the example use case, CreatePurchaseOrder is a possible enterprise service signature that is fully described by the $G_1$ and $G_2$. The corresponding RDF triples can be defined as:

$T_1 = \{\text{SalesOrderProcessing,hasBO,SalesOrder}\}$ $T_2 = \{\text{SalesOrder,hasBON,Item}\}$ Referring now to FIG. 5, a more detailed example of an enterprise service illustrates the ability to entirely describe complex enterprise services using artifacts. The example enterprise service can be provided as:
  BankAccountContractProcessingLoanDisbursementRequestActionIn.CalculateLoanDisbursementRequest This example enterprise service is equivalent to the following definition of signature $S_{B2}$ (note that $G_0$ represents a scheme of special symbols used in signatures, e.g., $(0, 1) \rightarrow$ "_", $(0, 2) \rightarrow$ ".", etc.):

$B^2 = (i,j)^8 = (1,2)+(1,3)+(2,1)+(4,1)+(0,2)+(2,2)+(1,3)+(3,1)$ $S_{B2} = (.B_2, G_iN_j) = G_1N_2 \cdot G_1N_3 \cdot G_2N_1 \cdot G_4N_1 \cdot \text{"."} \cdot G_2N_2 \cdot G_1N_3 \cdot G_3N_1$ The building rule (B) describes a generic instruction of concatenation of terms represented in the form of nodes in the knowledge base. Using the respective metadata related to these terms forms a concrete concatenation of instance data representing real enterprise service signatures. The enterprise service BankAccountContractProcessing LoanDisbursementRequestActionIn.CalculateLoanDisbursementRequest is an example of such a signature. As discussed above, the enterprise service signature is the technical name of the enterprise service and is used to unambiguously identify the enterprise service in a storage medium.

The example enterprise can be parsed to provide a plurality of terms 500, as discussed in detail below. The example terms 500 of FIG. 5 include BankAccountContractProcessing, LoanDisbursementRequest, Action, Calculate, Request and In. Each term 500 can be queried against metadata repositories 502*a-d* to determine whether the term is addressed in a particular repository 502*a-d*. For example, the term Action corresponds to a node of the metadata 502*b* (e.g., action node 460 of metadata 450 of FIG. 4B), which corresponds to an interface pattern (e.g., interface pattern node 446 of FIG. 4B). As another example, the term Request corresponds to a node of the metadata 502*c* (e.g., request confirmation node 486 of metadata 482 of graph 440 of FIG. 4B), which corresponds to a communication pattern (e.g., communication pattern node 480 of graph 442 of FIG. 4B). The annotation is represented as the metadata (204). However, the metadata is implicitly related to the corresponding node in the graph (206), which can be obtained by inference and/or reasoning.

Figure 6:
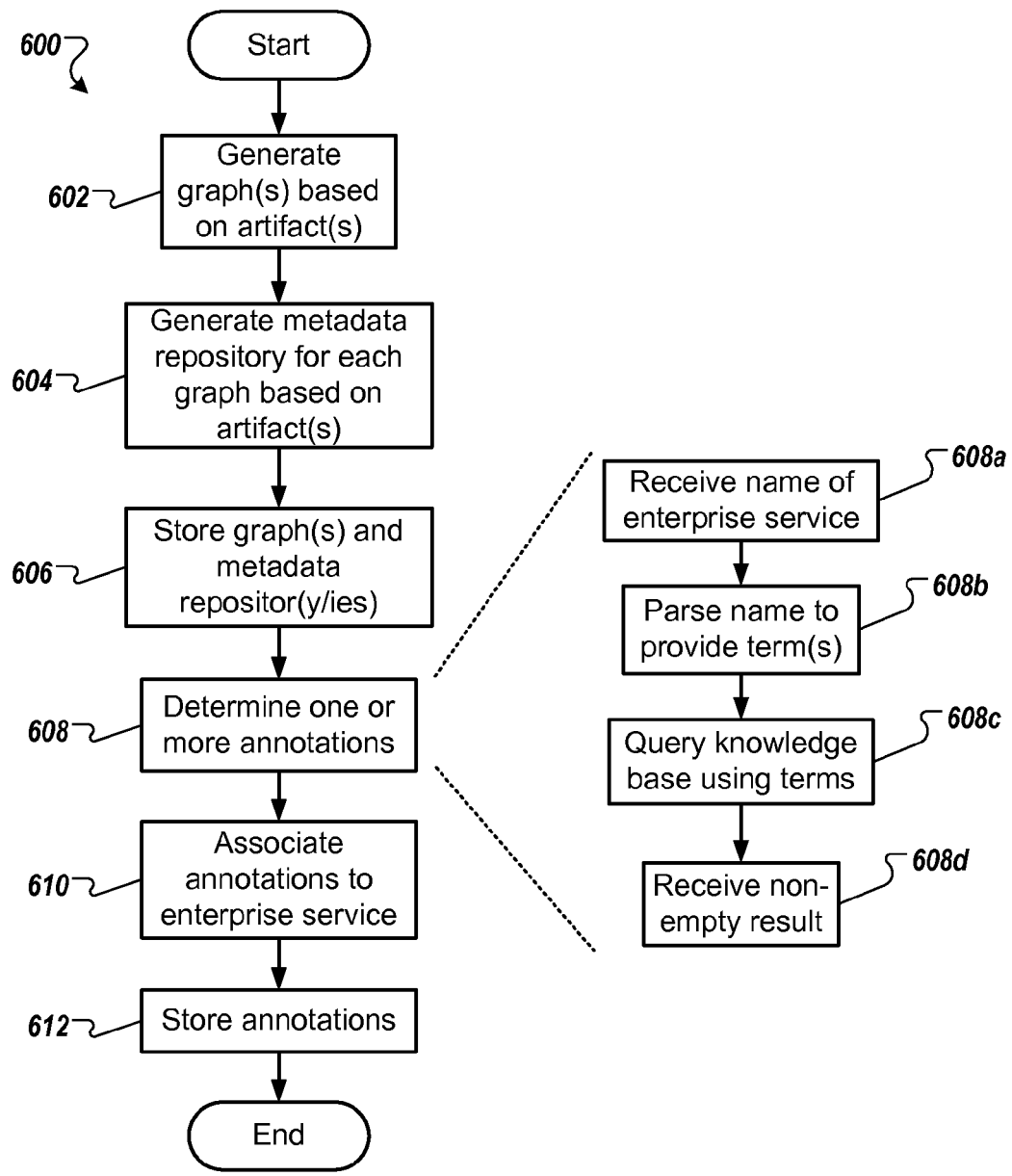
FIG. 6 is a flowchart depicting an example process that can be executed in accordance with implementations of the present disclosure.

FIG. 6 is a flow diagram of an example process 600 for annotating an enterprise service that is electronically stored in an enterprise service repository. One or more graphs are generated based on one or more artifacts (602). The one or more artifacts result from a development process of the enterprise service. One or more metadata repositories are generated based on the one or more artifacts (604). Each metadata repository includes instance data corresponding to one of the one or more graphs. The one or more graphs and the one or more metadata repositories are stored to a knowledge base provided in a computer-readable medium (606). One or more annotations are determined based on the one or more graphs and the one or more metadata repositories (608). The one or more annotations are associated to the enterprise service (610). The one or more annotations are stored in the enterprise service repository (612). In some implementations, determining one or more annotations (608) can include receiving a name of the enterprise service (608a), parsing the name of the enterprise service to provide one or more terms (608b), querying the knowledge base to recognize one or more valid/modeled terms (608c), and receiving a non-empty result based on the querying for recognized terms that are in fact used as annotations (608d).

Implementations of the present disclosure enable the automated extraction of metadata used to annotate enterprise services, and, using the annotation metadata, the discovery of enterprise services can be facilitated and tailored towards a business user's perspective. The automated extraction and use of metadata benefit any kind of composition environment (e.g., user-centric BPM or enterprise mashups) by supporting less tech-savvy business users to more easily find and use enterprise services.

Figure 7:
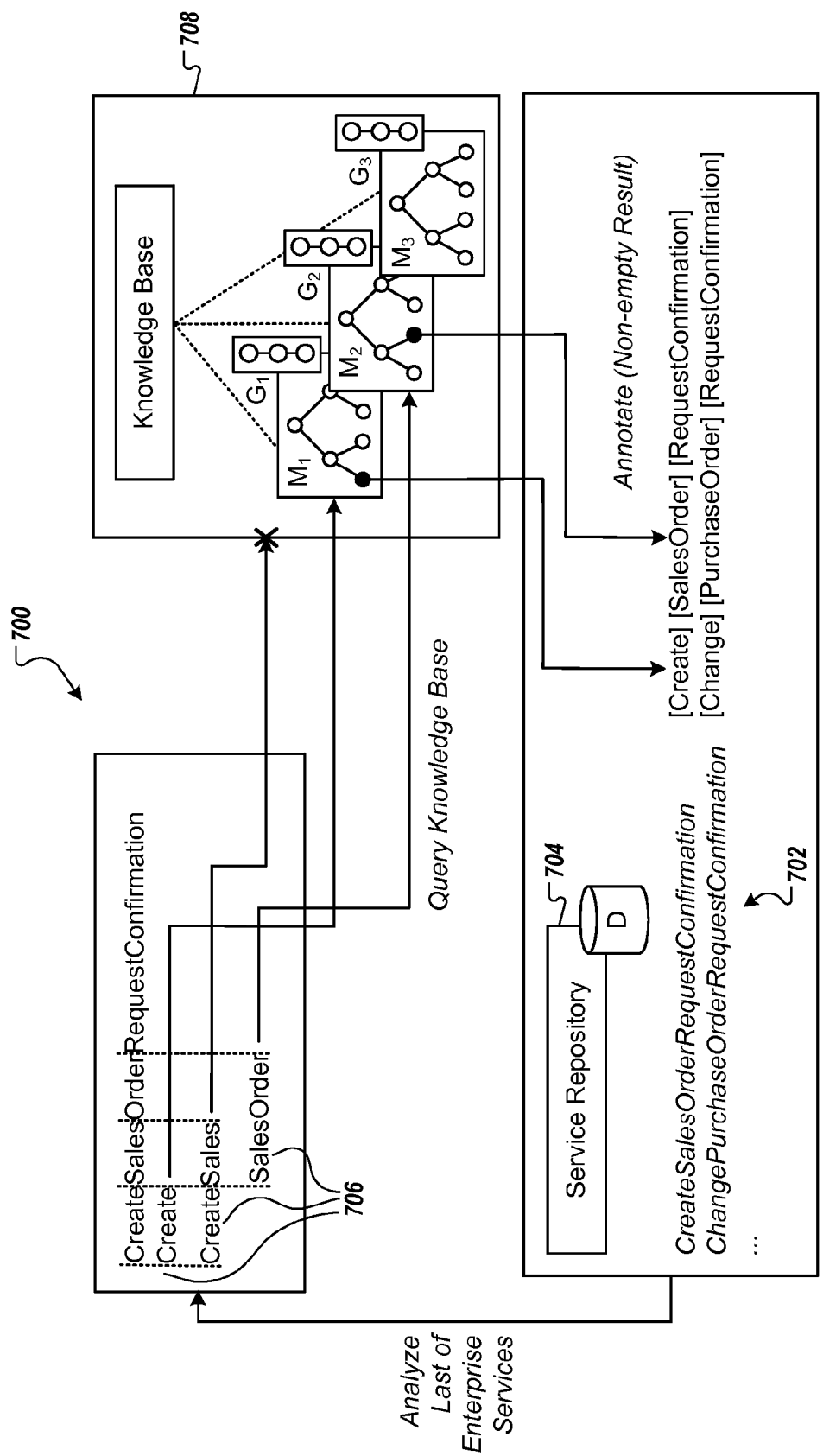
FIG. 7 depicts an example process for annotating enterprise services.

With respect to automated extraction, and with reference to FIG. 7, the data model effectively captures and describes artifacts used during a governance-driven service development process, and can therefore automate the extraction given that the corresponding knowledge base has been created beforehand. In some implementations, the enterprise service signature can use a Pascal Case notation, which facilitates the automated extraction of metadata.

With continued reference to FIG. 7, an example process 700 will be described. A list of enterprise services 702 can be provided from a service repository 704. The example list of FIG. 7 includes CreateSalesOrderRequestConfirmation and ChangePurchaseOrderRequestConfirmation, among others. For each enterprise service, every possible combination of strings, referred to as terms 706, that can be separated utilizing the Pascal Case notation is determined. In the example of FIG. 7, CreateSalesOrderRequestConfirmation can include terms Create, CreateSales and SalesOrder, among others. Each metadata repository $M_i$ 706 within a knowledge base 708 is queried for each term to determine whether the metadata repository contains a node $N_i$ that refers to the particular term. If the query returns a non-empty result, then the term is known to the knowledge base 708 and the original enterprise service can be annotated with a reference to the corresponding node $N_i$. If the result of the query is empty, the particular term is unknown to within the knowledge base 708, and no annotation of the enterprise service is provided.

As noted above, the technical complexity of enterprise services has hindered their adoption, particularly with regard to creating composite applications from a plurality of enterprise services. In general, this domain has targeted enterprise developers that have the required technical knowledge to understand enterprise services. Implementations of the present disclosure empowers business users, that may have little or no technical skill, use, search and discover relevant enterprise services. As noted above, implementations of the present disclosure are based on governance artifacts and enable the automated extraction of metadata, and facilitate the discovery of enterprise services. As a result, business users are given the opportunity to find enterprise services based on business requirements rather than technical skills. Consequently, a business user does not have to rely on a technical user (e.g., from an IT department) to perform the discovery, significantly improving and accelerating the development of new composite applications and systems that can include a plurality of enterprise services.

Figure 8:
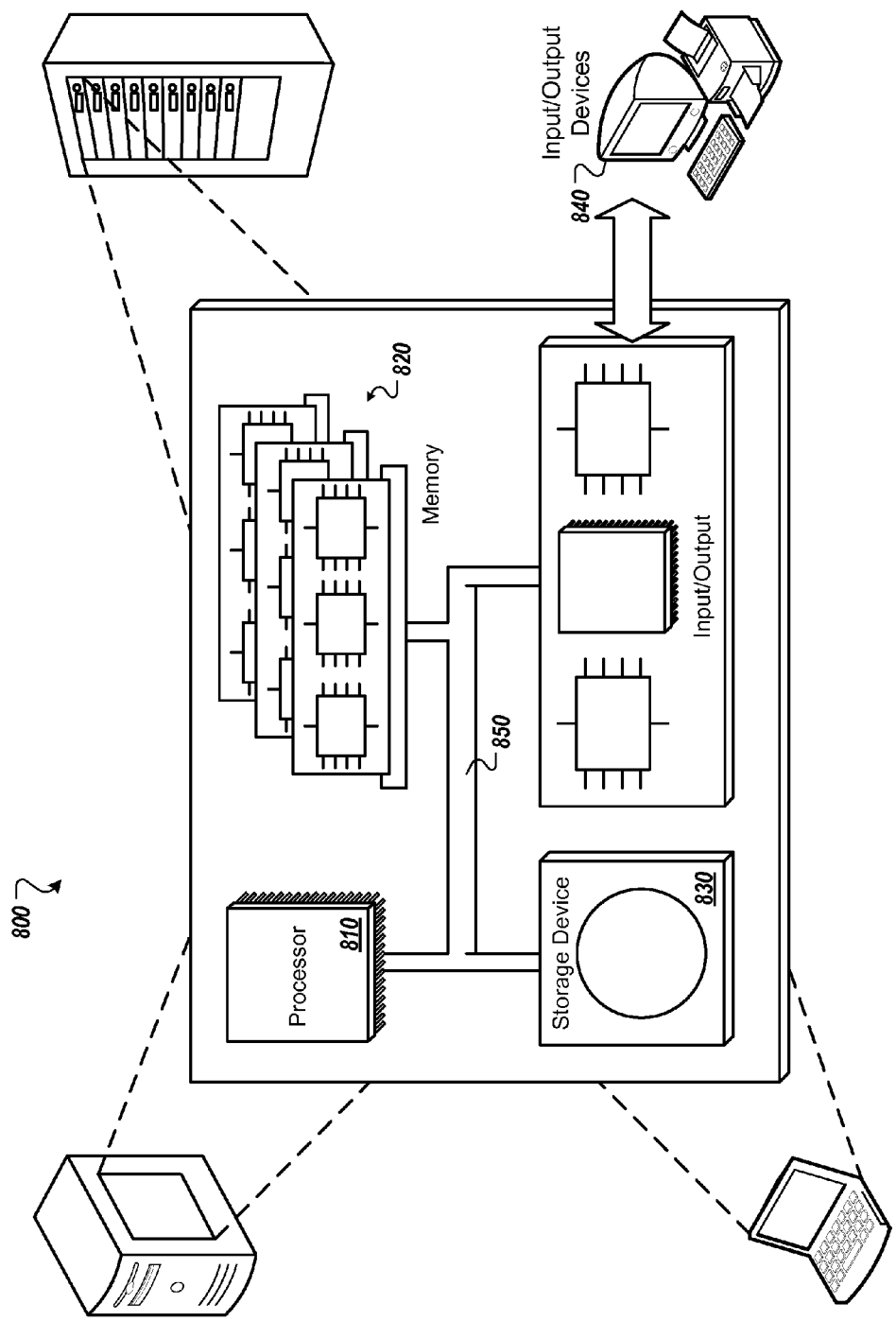
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for annotating an enterprise service, the method comprising:
storing the enterprise service in an enterprise service repository, the enterprise service repository storing a plurality of enterprise services, each enterprise service comprising a callable entity that provides business functionality;
generating, by one or more processors, one or more graphs based on one or more artifacts, the one or more artifacts resulting from a development process of the enterprise service;
generating, by the one or more processors, one or more metadata repositories based on the one or more artifacts, each metadata repository comprising instance data that is automatically extracted from various sources and corresponds to one of the one or more graphs;
storing, by the one or more processors, the one or more graphs and the one or more metadata repositories to a knowledge base provided in a non-transitory computer-readable storage medium;
querying, by the one or more processors, the knowledge base to determine one or more annotations based on the one or more graphs and the one or more metadata repositories;
annotating, by one or more processors, the enterprise service with the one or more annotations; and
storing the one or more annotations in the enterprise service repository.

2. The method of claim 1, wherein annotating comprises:
receiving a name of the enterprise service;
parsing the name of the enterprise service to provide one or more terms;
querying the knowledge base using the one or more terms; and
receiving a non-empty result based on the querying.

3. The method of claim 2, wherein the non-empty results comprises the one or more annotations.

4. The method of claim 1, wherein the one or more annotations each correspond to a node of metadata of the one or more metadata repositories.

5. The method of claim 1, further comprising:
generating an enterprise service signature as a concatenation of terms of one or more nodes of the one or more graphs;
associating the enterprise service signature to the enterprise service; and
storing the enterprise service signature in the enterprise service repository.

6. The method of claim 1, further comprising:
receiving a search query comprising one or more search terms;
querying the enterprise service repository using the one or more search terms;
identifying, in response to the querying, one or more enterprise services as relevant to the one or more search terms; and
transmitting a representation of each of the one or more enterprise services for display as a result of the search query.

7. The method of claim 1, wherein each of the one or more metadata repositories is provided in a resource description framework (RDF) data store.

8. The method of claim 7, wherein the RDF data store includes one or more RDF triples that correspond to one or more edges between nodes of metadata.

9. The method of claim 1, wherein the one or more artifacts each comprise one of a business requirements artifact, a component model taxonomies artifact and a governance conventions artifact.

10. The method of claim 1, wherein an enterprise name is provided in Pascal Case notation.

11. The method of claim 1, wherein the development process corresponds to a governance process of an enterprise associated with the enterprise service.

12. A non-transitory computer-readable storage medium coupled to one or more processors and having instructions stored thereon which, when executed by the one or more processors, cause the one or more processors to perform operations for annotating an enterprise service, the operations comprising:
- storing the enterprise service in an enterprise service repository, the enterprise service repository storing a plurality of enterprise services, each enterprise service comprising a callable entity that provides business functionality;
- generating, by the one or more processors, one or more graphs based on one or more artifacts, the one or more artifacts resulting from a development process of the enterprise service;
- generating, by the one or more processors, one or more metadata repositories based on the one or more artifacts, each metadata repository comprising instance data that is automatically extracted from various sources and corresponds to one of the one or more graphs;
- storing, by the one or more processors, the one or more graphs and the one or more metadata repositories to a knowledge base provided in a computer-readable medium;
- querying, by the one or more processors, the knowledge base to determine one or more annotations based on the one or more graphs and the one or more metadata repositories;
- annotating, by one or more processors, the enterprise service with the one or more annotations; and
- storing the one or more annotations in the enterprise service repository.

13. A system, the system comprising:
- a computing device comprising one or more processors; and
- a computer-readable storage device coupled to the computing device and having instructions stored thereon which, when executed by the computing device, cause the computing device to perform operations for annotating an enterprise service, the operations comprising:
  - storing the enterprise service in an enterprise service repository, the enterprise service repository storing a plurality of enterprise services, each enterprise service comprising a callable entity that provides business functionality;
  - generating, by the one or more processors, one or more graphs based on one or more artifacts, the one or more artifacts resulting from a development process of the enterprise service;
  - generating, by the one or more processors, one or more metadata repositories based on the one or more artifacts, each metadata repository comprising instance data that is automatically extracted from various sources and corresponds_to one of the one or more graphs;
  - storing, by the one or more processors, the one or more graphs and the one or more metadata repositories to a knowledge base provided in a non-transitory computer-readable medium;
  - querying, by the one or more processors, the knowledge base to determine one or more annotations based on the one or more graphs and the one or more metadata repositories;
  - annotating, by one or more processors, the enterprise service with the one or more annotations; and
  - storing the one or more annotations in the enterprise service repository.

* * * * *